Figure 1:
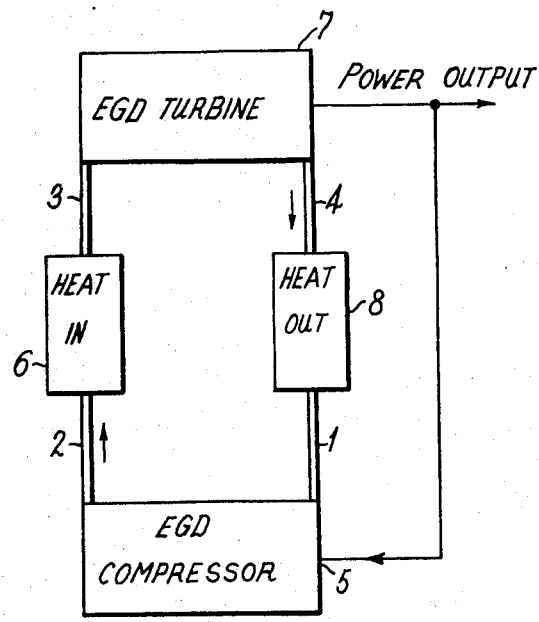

United States Patent [19]
Musgrove

[11] 3,723,777
[45] Mar. 27, 1973

[54] ELECTROGASDYNAMIC GENERATORS

[75] Inventor: Peter James Musgrove, Barley, England

[73] Assignee: National Research Corporation, London, England

[22] Filed: Mar. 1, 1971

[21] Appl. No.: 119,804

[52] U.S. Cl. ............................ 310/5, 310/4, 310/10, 60/1
[51] Int. Cl. ................................................ H02n 1/00
[58] Field of Search ........ 310/10, 4, 5, 6; 60/202, 24, 60/1; 417/48

[56] References Cited

UNITED STATES PATENTS

| | | | |
|---|---|---|---|
| 3,405,291 | 10/1968 | Brandmaier | 310/5 X |
| 3,474,266 | 10/1969 | Koupal | 310/5 |
| 3,456,135 | 7/1969 | Marks | 310/10 |
| 3,569,751 | 3/1971 | Ruhnke | 310/10 |
| 3,582,694 | 6/1971 | Gourdine | 310/10 |
| 3,099,131 | 7/1963 | Rosa | 60/202 |
| 3,514,644 | 5/1970 | Fonberg | 310/10 |

*Primary Examiner*—D. F. Duggan
*Attorney*—Cushman, Darby & Cushman

[57] ABSTRACT

An electrogasdynamic generator uses a gas containing small particles as the working fluid. The gas is circulated in a thermodynamic cycle round a closed loop and in an expansion stage the particles are electrically charged to expand against an electric field and in a compression stage are electrically charged to be compressed with the assistance of an electric field. The thermodynamic cycle used is the Ericsson cycle in which the gas is heated during its passage through the expansion stage and is cooled during its passage through the compression stage. A heat exchanger is incorporated between the two stages.

3 Claims, 6 Drawing Figures

ELECTROGASDYNAMIC GENERATORS

This invention relates to electrogasdynamic (egd) generators.

In egd generators a carrier gas containing fine particles is driven along a path and the particles are electrically charged and then transported by the gas flow against an electric field and thereafter the charges are removed. Work is done on the particles in moving them against the electric field and electricity is thereby generated.

It has been suggested that since an egd generator uses a gas to transport electric charge the generator could be incorporated into a thermodynamic cycle and used to convert heat directly into electricity without the intervention of mechanically moving parts.

The basic egd generator in which gas expands and does work on charged particles by transporting them against an electric field may be regarded as analogous to the turbine of a gas turbine engine. Furthermore if a reverse acting stage is provided in which electrical power is supplied and the flow of electrically charged particles is aided by an electric field the gas will be compressed. This is the egd analogue of a gas turbine compressor. The egd compressor and turbine may then be combined with a heat source and sink in a closed cycle. The thermodynamic cycle that is used in a gas turbine engine is the Brayton cycle and this comprises a heating stage, an expansion stage, a cooling stage and a compression stage.

The efficiency of the Brayton cycle is much affected by component inefficiencies.

It is therefore an object of the invention to provide an egd generator having a thermodynamic cycle which is less sensitive to component inefficiencies and which will enable a larger overall efficiency of energy conversion from heat to electricity to be obtained.

In order to fulfil the above object an electrogasdynamic generator in accordance with the invention utilizes the Ericsson cycle. In the Ericsson cycle heat is applied to the carrier gas while it is in the expansion stage and heat is extracted from the carrier gas while it is in the compressor stage. A heat exchanger is incorporated to enable gas flowing from the expansion stage to the compression stage to give heat to gas flowing from the compression stage to the expansion stage.

Figure 2:
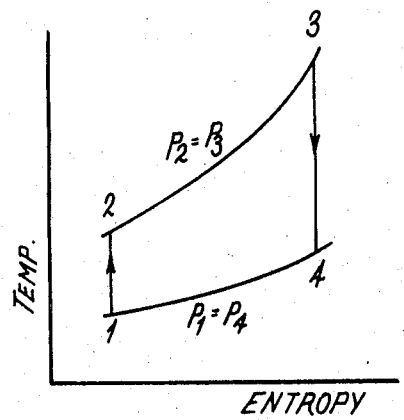
Figure 3:
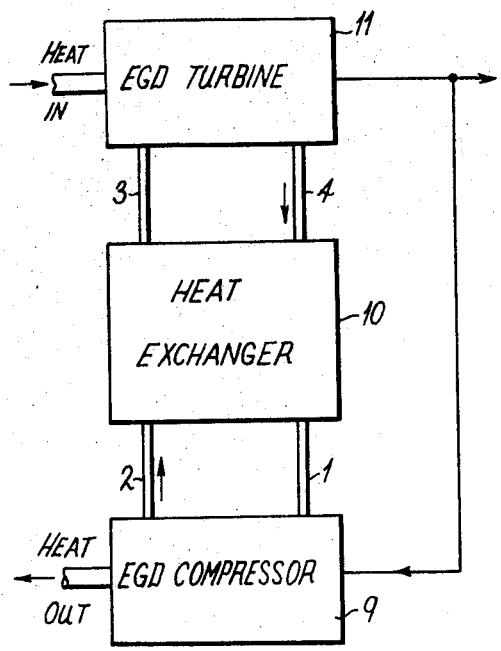
Figure 4:
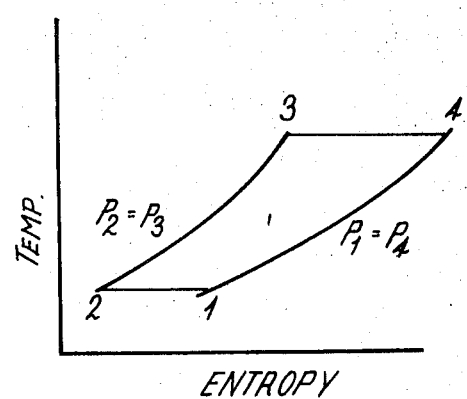
Figure 5:
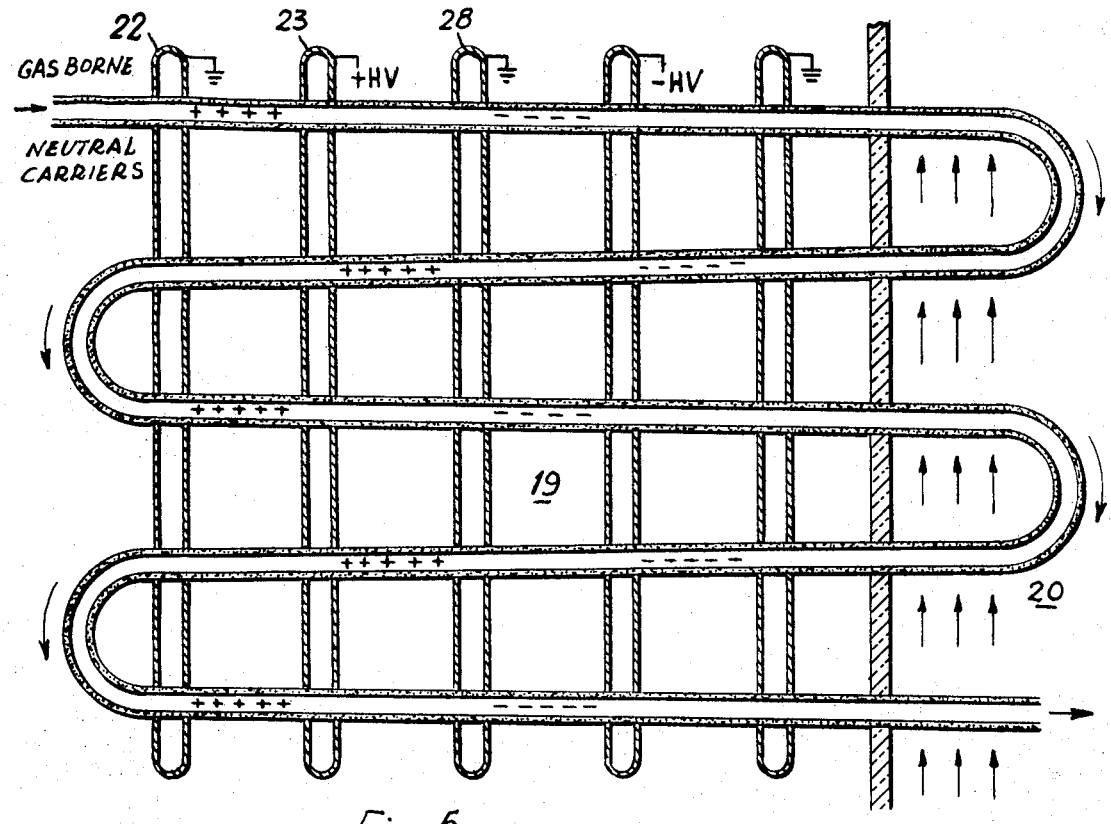
Figure 6:
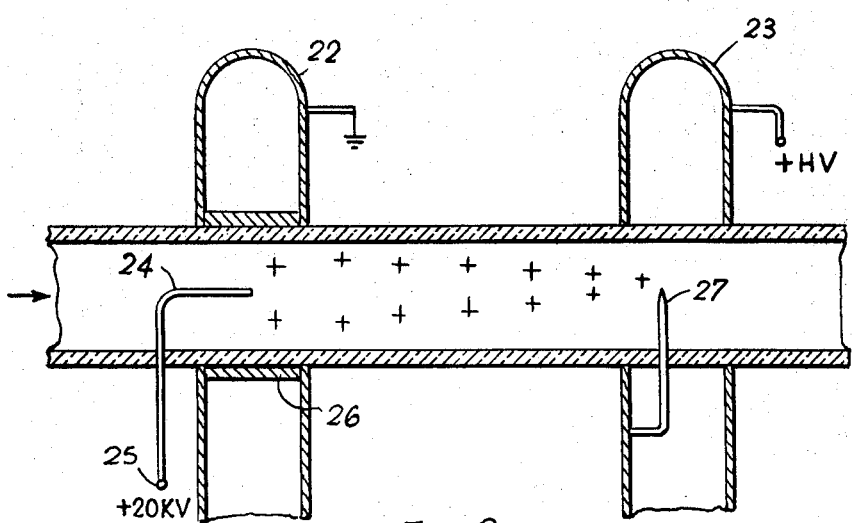

In order that the invention may be more fully understood, reference will now be made to the accompanying drawings in which:

FIG. 1 illustrates in diagrammatic form an egd generator operating on the Brayton cycle, FIG. 2 is a temperature/entropy diagram of the Brayton cycle, FIG. 3 illustrates in diagrammatic form an egd generator operating on the Ericsson cycle, FIG. 4 is a temperature/entropy diagram of the Ericsson cycle, FIG. 5 illustrates an egd generator embodying the invention, and FIG. 6 illustrates a detail of FIG. 5.

Referring now to FIG. 1 the gas engine shown therein comprises a compressor 5 in which a gas is compressed by the application of energy, which in an egd generator will be electrical energy. The compressed gas then passes on to a heater 6 and then to an expansion stage 7 wherein the heated gas expands and does work which in the case of an egd generator will provide an electrical output. The electrical output from the expansion stage is greater than the electrical input to the compression stage. The expanded gas from the expansion stage 7 is then cooled in a cooling unit 8 and is then returned to the compressor 5.

With stations 1, 2, 3 and 4 around the engine as marked the resulting temperature/entropy diagram is shown in FIG. 2 for an ideal engine where it will be seen that in the compressor stage the gas increases its temperature by adiabatic compression at constant entropy, is then heated at constant pressure in the heater stage 6 and expands adiabatically in the expansion stage 7 at constant entropy and finally is cooled at a constant pressure in the cooling stage 8.

A heat engine operating on the Ericsson cycle is shown in FIG. 3. In this cycle the gas is cooled while it is in a compressor stage 9 so that the gas therein emerges at much the same temperature at which it enters. The gas then passes through a heat exchanger 10 at which it receives heat from the expanded gas from the expansion stage 11. The gas is then itself expanded in the expansion stage 11 during which stage heat is applied to maintain substantially constant the temperature of the gas therein. The gas is then returned to the compressor through the heat exchanger 10 where it gives up some of its heat to the incoming gas to the expansion stage.

The resulting temperature/entropy diagram for an ideal engine is shown in FIG. 4 with the stations around the engine similarly numbered as in FIG. 1. It will be seen that the difference between the Ericsson cycle and the Brayton cycle is that in the Ericsson cycle the compressor and the turbine are operated at substantially constant temperature rather than at constant entropy. Markedly higher operating efficiencies in a practical engine are achieved thereby.

FIG. 5 illustrates an expansion stage of an electrogasdynamic generator embodying the invention. A duct 21 passes right through the stage for carrying gas therethrough. The gas contains dust, for example fine particles of silicon carbide of size of the order of 1 micron. The expansion stage is in two parts, namely an electricity generation part 19 and a heating part 20 and duct 21 zig-zags alternately between these two parts of the expansion stage so that after some generation of electricity during which the gas expands it is heated in part 20 and then returns to a further step of electricity generation and again thereafter is heated further. In the part 19 of the expansion stage concerned with electricity generation the duct is of insulating material for instance a ceramic, but in the heating part 20 a metal tube may conveniently be used to ensure the maximum amount of heat conduction to the gas. Conveniently the duct in part 20 is heated by hot gases from any suitable furnace flowing perpendicularly to duct 21.

The electricity generation part 19 of the expansion stage is divided into a number of sections. At the commencement of each section there is provided an electric charge emitter and at the end of each section there is an electric charge collector. An electric field is applied in the gas flow path between the emitter and collector and the polarities of the charges supplied to the particles in the gas are such that they are carried by the gas flow against the direction of the electric field.

Between successive sections there are lengths of duct in which the particles are uncharged.

FIG. 6 illustrates a length of the duct 21 of FIG. 5 in greater detail. This length comprises the first energy conversion section of the duct. This section is defined between two Faraday cages 22 and 23 which are spaced apart from each other and which surround the duct. Cage 22 is at earth potential whereas cage 23 is at a high voltage positive potential. In case 22 there is provided an emitter in the form of a wire electrode 24 which is connected to a terminal 25 at a potential of say plus 20kv. A conducting insert 26 connected to cage 22 is provided around wire 24 and the corona discharge between wire 24 and surround 26 causes the emission of positive charges from wire 24 to charge the particles in the gas stream positively. These charged particles are carried by the gas flow towards cage 23 at which the positive charges are collected. Since cage 23 is at a high positive potential compared with the earth potential of cage 22 there is a potential gradient between cages 22 and 23 against which the positive charges on the particles in the gas are carried by the gas flow. In this transport the charges do work against the field, the energy being supplied by the expansion of the gas as it passes through the section. In cage 23 there is provided one or more point electrodes such as electrode 27 connected to the cage and which serve to collect the positive charges carried to the cage. The gas is then carried from a high potential to earth potential at cage 28 in a neutral length of duct. Cage 28 contains an emitter similar to emitter 24 but connected to a negative source so that negative charges are emitted.

It will be seen that after passing through two successive sections in which the particles are charged alternately positively and negatively as shown the particles in the gas will be returned to earth potential. If desired the duct can now enter the heating part 20 of the expansion stage or else a further number of energy conversion stages can be provided.

After passing through the heating part of the expansion stage the duct can return through two or more energy conversion stages and since the relevant Faraday cages of these further sections will be at the earth potentials of cages 22 and 28 or else at the high positive and negative potentials of cages 23 and 29 the cages at the same potentials can be connected together.

While only one duct 21 is shown in FIG. 5 it will be appreciated that a number of such ducts in parallel can be provided all passing through the same Faraday cage structures.

The compression stage of the egd generator will have a generally similar layout to the expansion stage and will be divided into two parts namely an energy conversion part and a cooling part. The energy conversion part of the compression stage will be generally similar to the energy conversion part of the expansion stage except that the polarities of the particles emitted into the gas stream will be reversed so that the particles move down a potential gradient rather than against it. Thus for example, the first section of the compression stage is generally similar to the first section of the expansion stage shown in FIG. 6 and the first emitter electrode within the earthed Faraday cage will be connected to a point of negative potential of about minus 20kv so that negatively charged particles are emitted. Similarly the emitter electrode of the second energy conversion section will be arranged to emit positively charged particles by being connected to a point which is at about plus 20kv. In the compression stage the effect of the electric field on the gas particles will be to compress the gas.

I claim:

1. An electrogasdynamic generator including:
an expansion stage for carrier gas comprising:
a gas flow path including a plurality of energy conversion sections and gas heating sections provided alternately in succession along the gas flow path,
each energy conversion section comprising an electric charge emitter and an electric charge collector spaced apart from each other along the gas flow path, and means for applying an electric field along the gas flow path in the energy conversion section to oppose the flow of charged particles, and
the gas heating sections comprising:
means for applying heating fluid in thermal contact with the gas flow path between energy conversion sections to restore the temperature of the gas to its original level.

2. An electrogasdynamic generator as claimed in claim 1 further including:
a compression stage for carrier gas comprising:
a gas flow path including a plurality of energy converstion sections, and gas cooling sections provided alternately in succession along the gas flow path, each energy conversion section comprising an electric charge emitter and an electric charge collector spaced apart from each other along the gas flow path, and means for applying an electric field along the gas flow path in the energy conversion section to aid the flow of charged particles, and
the gas heating sections comprising:
means for applying cooling fluid in thermal contact with the gas flow path between energy conversion sections to restore the temperature of the gas to its original level; and
the gas flow path of the expansion stage and the gas flow path of the compression stage being connected together to form a closed loop.

3. An electrogasdynamic generator as claimed in claim 2 in which a heat exchanger is provided between said expansion stage and said compression stage wherein gas flowing from said expansion stage to said compression stage gives heat to gas flowing from said compression stage to said expansion stage.

\* \* \* \* \*